Inventors:
Mark Ewald
Henry Skog
By: Cox & Moore attys.

May 20, 1941.  M. EWALD ET AL  2,242,243
FRUIT TREATING APPARATUS
Original Filed May 7, 1936  6 Sheets-Sheet 2
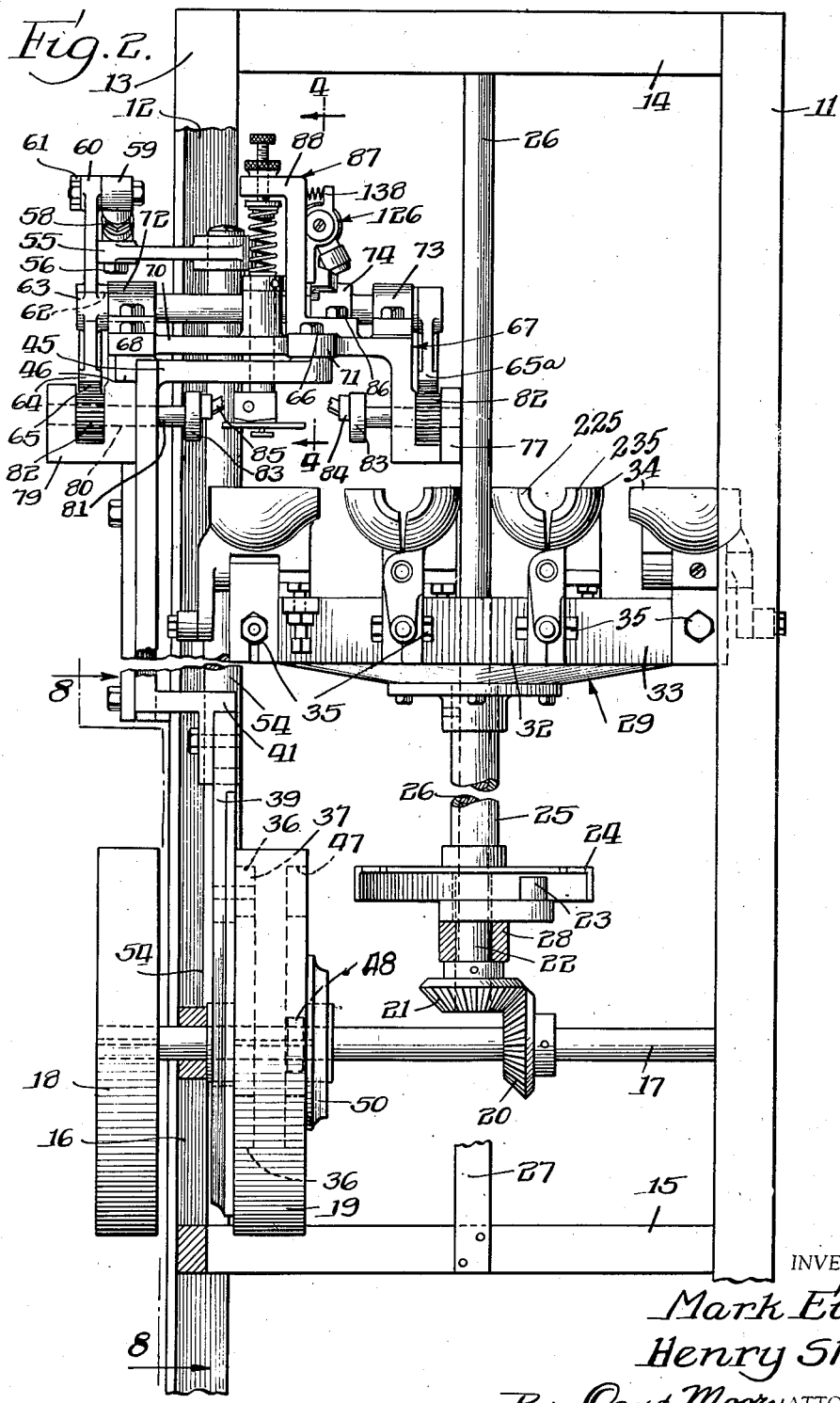
INVENTORS
Mark Ewald
Henry Skog
By:- Cox & Moore ATTORNEYS.

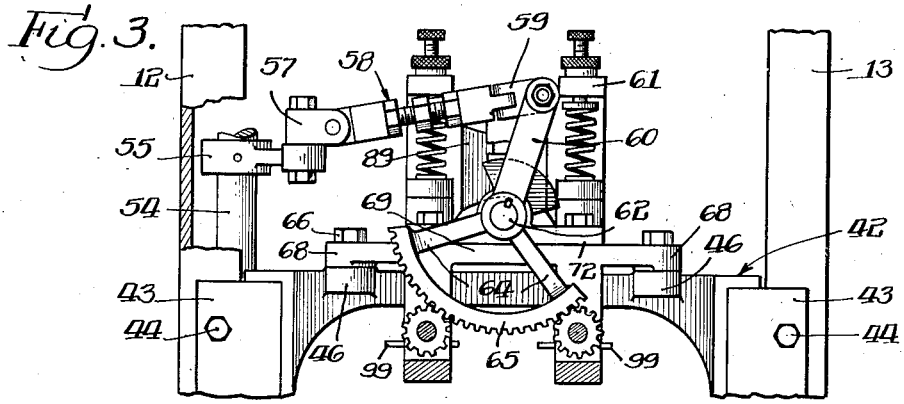
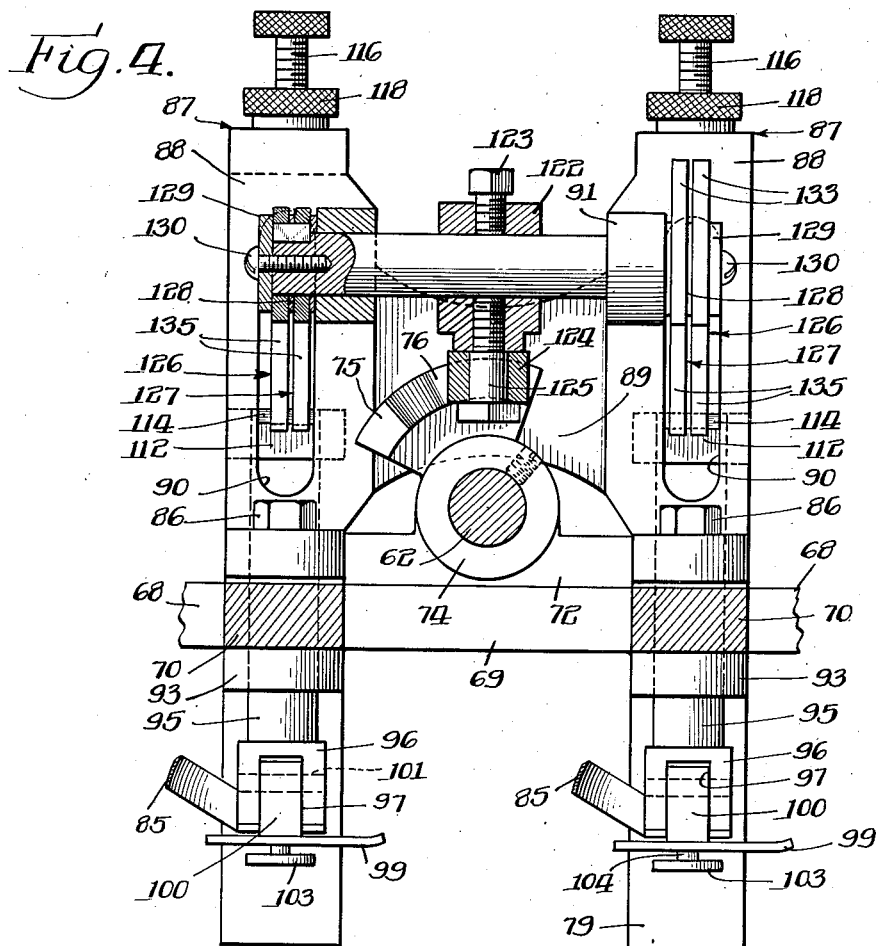

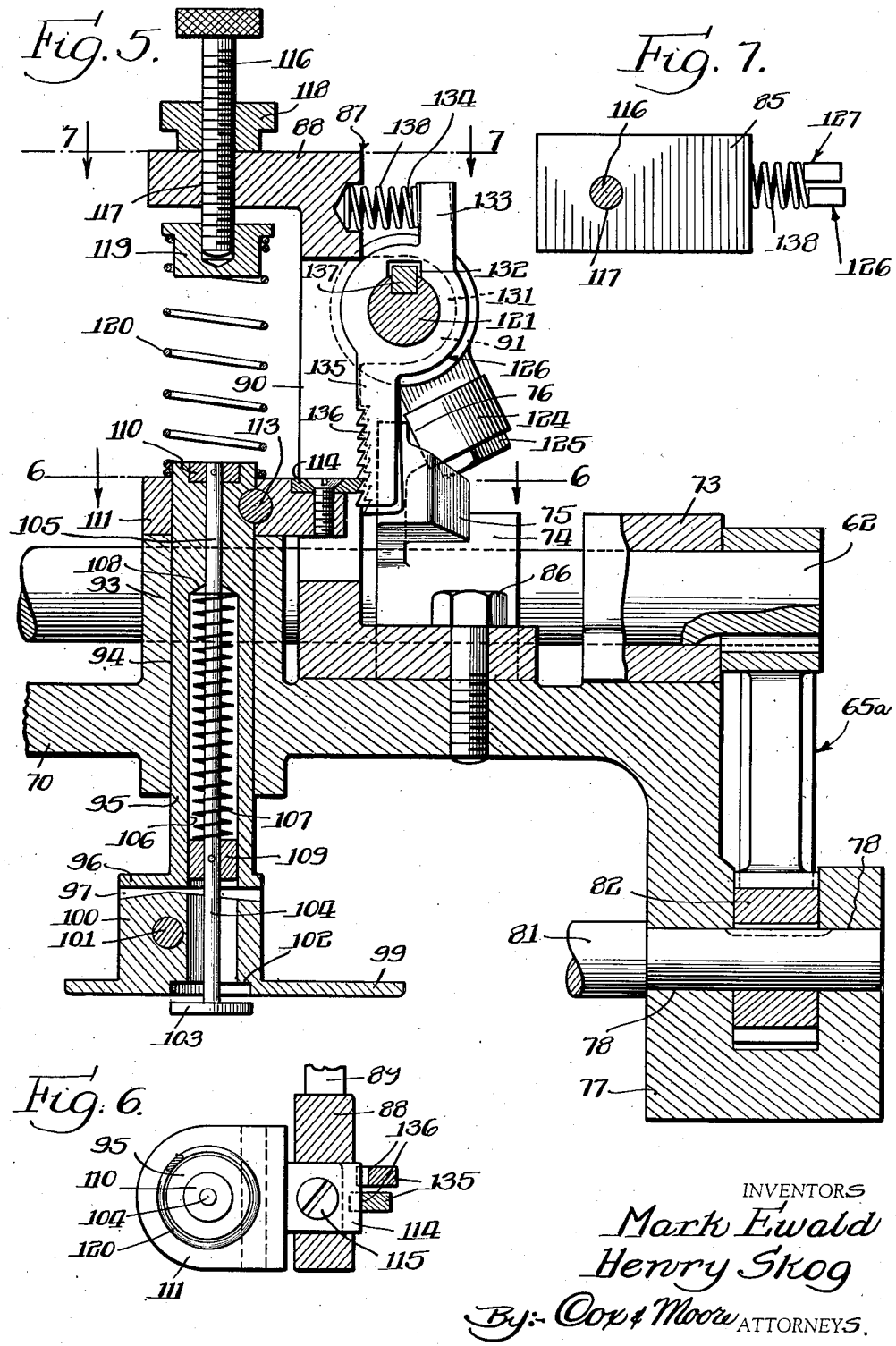

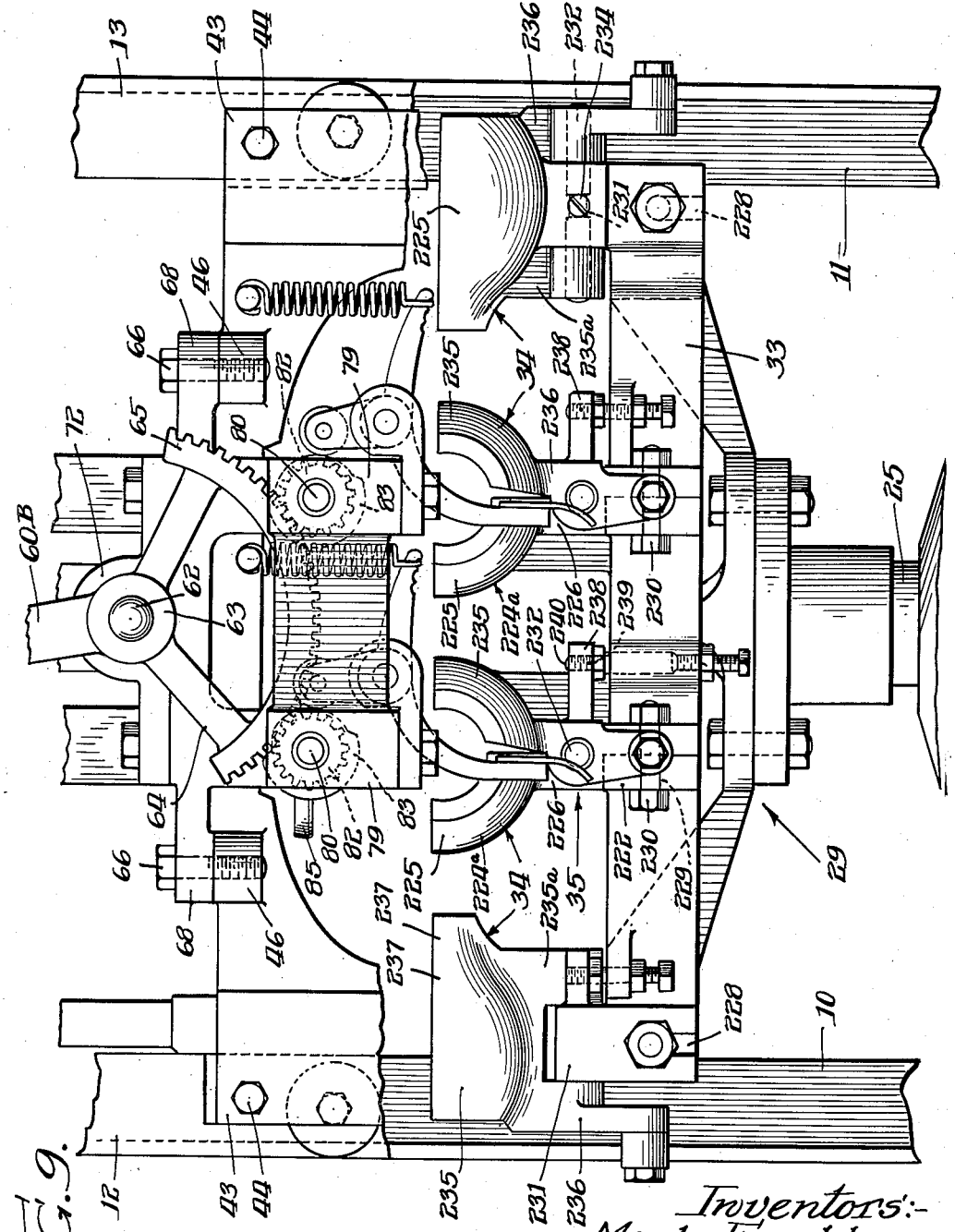

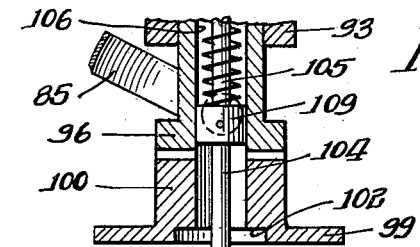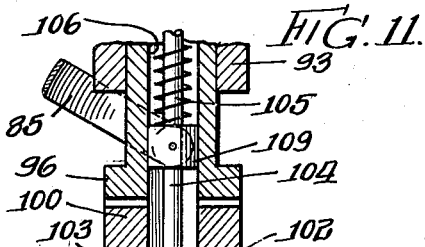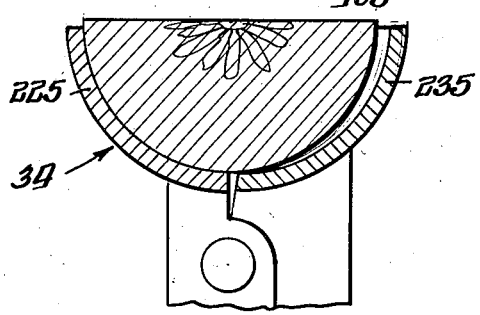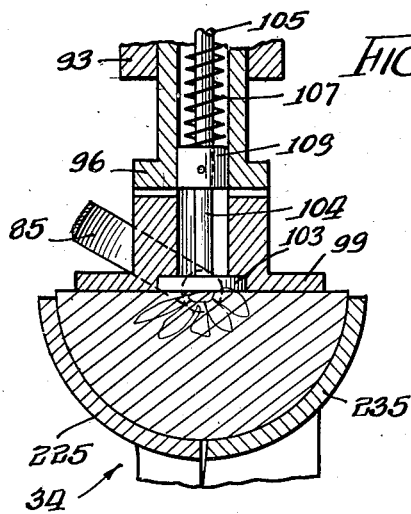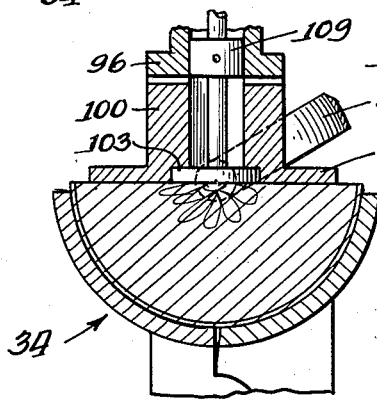

Patented May 20, 1941

2,242,243

UNITED STATES PATENT OFFICE 2,242,243

FRUIT TREATING APPARATUS

Mark Ewald and Henry Skog, Olympia, Wash., assignors to Special Equipment Company, Portland, Oreg., a corporation of Oregon Application May 7, 1936, Serial No. 78,508
Renewed November 24, 1939

38 Claims. (Cl. 146—43)

This invention relates to fruit holding and cutting apparatus. It has to do more particularly with an apparatus for retaining a fruit in a receptacle or holder during a cutting operation on such a fruit.

The apparatus herein described is designed effectively to hold or retain various grades and kinds of half sections of fruit in position during a cutting operation performed on such half fruit.

One of the objects of the present invention is the provision of means for bringing a member into effective engagement with the cut or flat face of a half fruit, and means automatically operative in part positively and in part yieldingly to maintain such a member in effective position during a cutting operation performed upon such half fruit.

Another object of this invention is the provision of improved fruit retaining means moving in timed relation with a series of intermittently moving receptacles and coming into effective position during a period of rest between movements of such receptacles.

These objects, and such other objects as may hereinafter appear, are obtained by the unique arrangement, novel combination and improved construction of the several elements comprising a single embodiment of the invention herein described which will be fully understood by reference to the accompanying six sheets of drawings, hereby made a part of this specification, and upon which:

Figure 2 is a side view looking at the right hand side of the machine shown in Figure 1, parts being broken away to more clearly illustrate the invention;

Figure 3 is a front view of the upper portion of the machine shown in Figure 1;

Figure 4 is a vertical sectional taken on the line 4—4 of Figure 2;

Figure 5 is a sectional view taken on the line 5—5 of Figure 1;

Figure 6 is a horizontal section taken on the line 6—6 of Figure 5;

Figure 7 is a section taken on the line 7—7 of Figure 5;

Figure 9 is a view showing the cup operating mechanism; and

Figures 1, 8:
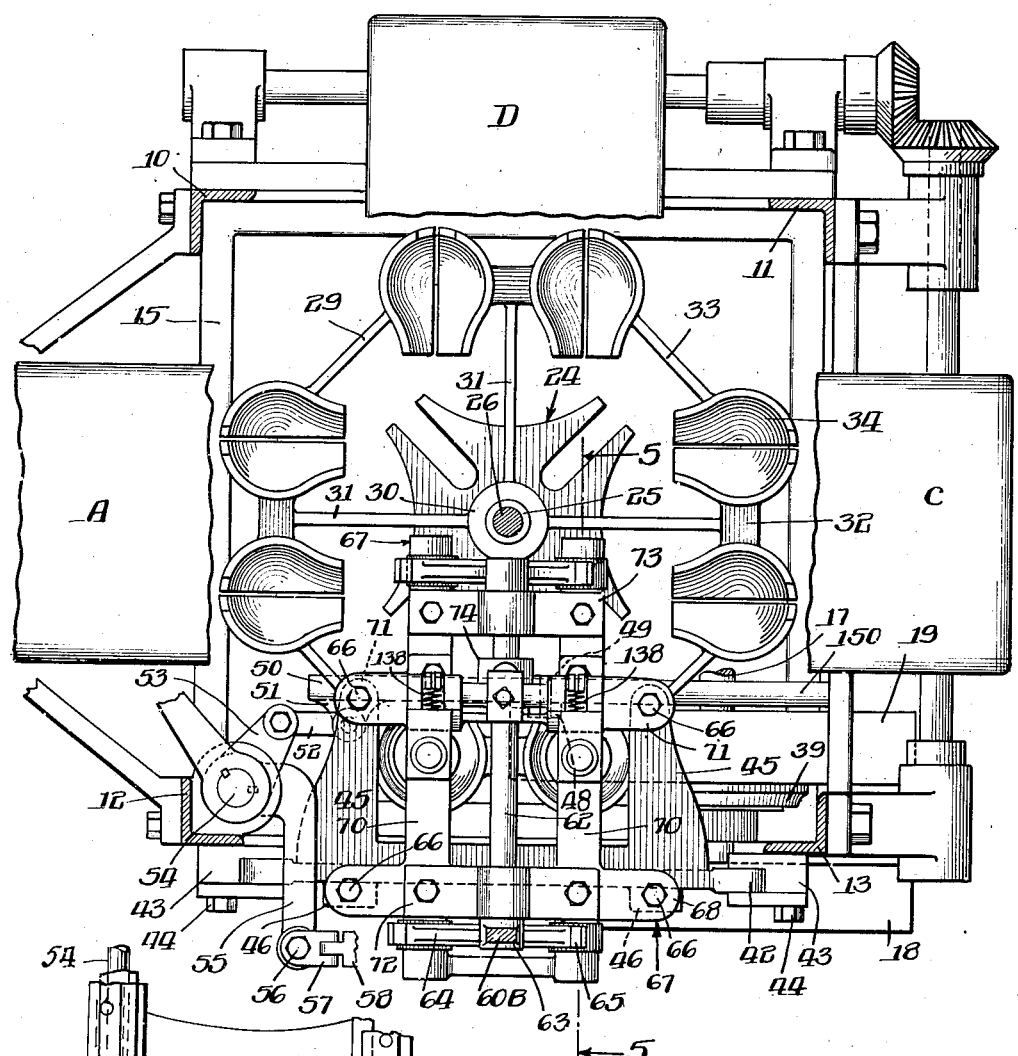
Figure 1 is a plan view of one type of fruit treating machine illustrating the present invention as applied thereto.
Figure 8 is a section taken on line 8—8 of Figure 2, showing the driving mechanism of the machine.

Figures 10 to 15, inclusive, are successive diagrammatic views showing in consecutive order the various steps in the treatment of the fruit performed by the structure herein disclosed.

Like reference characters are used in the drawings and throughout the following description for designating similar parts of the invention.

The present invention is broadly adaptable to any type of fruit cutting apparatus wherein it is desirable automatically adjustably and firmly to hold a fruit during a cutting operation to be performed thereon. In one of its particular embodiments, the invention is especially adapted for holding half fruits or fruit sections in suitably formed fruit holding means during and while a cutting action is made upon the half fruit; more specifically the invention is adapted to means adapted to hold half fruits in substantially recessed and/or cup-like holders with the flat or cut face of the half fruit exposed, and wherein means is provided for contacting the flat or cut face of the half fruit to hold the fruit from turning or shifting as a result of and during the cutting operation.

Due to the necessity of handling not only various types of fruit, such as pears, peaches, apricots, plums and the like, which vary in size and shape, but also due to the necessity of handling and cutting these fruits during variant degrees of ripeness, as when they are somewhat green, approaching ripeness, or when they are ripe, it is advantageous to have a fruit retaining means automatically of considerable flexibility as to capacity not only for variant sizes when operating upon the same type of fruit, but also when handling and holding such fruits of varying degrees of ripeness. For example, when cutting, as in peeling or coring pears or pitting peaches, the difference between soft and green fruit demands an effective means providing instant automatic adjustment of the holding means to compensate for the variant sizes and shapes of the pears, and also automatically operating means for firmly holding and positively locking from movement in any adjusted position the fruit holding means during certain portions of the cutting operation during which the cutter tends to shift or turn the fruit as it passes through the flesh of the fruit.

The present invention provides means for yieldably mounting the half fruit holding mechanism to permit it resiliently to adjust itself while in contact with the fruit to accommodate fruits of variant sizes and, in addition, means automatically and positively to lock or hold the fruit holding means in this automatically selected adjustment during a predetermined portion of the fruit cutting movement whereby it is possible not only to use much weaker spring means for holding the fruit holding means in centering and holding engagement with the fruit during the cutting operation, with a resultant more gentle action on the fruit, but whereby is eliminated the necessity of varying the tension of the spring means to accommodate either hard or soft fruit. The invention thus provides a proper spring tension for the fruit contacting and holding means which is necessary in order to overcome the tendency of the cutting means to lift or dislodge the fruit relative to its holder, even to the point—as when the cutter is a peeling mechanism—of completely lifting the half fruit out of its holding means.

A fruit treating machine to which the present fruit retaining device, for purposes of illustration, is applied has four stations situated ninety degrees apart about a central vertical shaft. At station A (referring to Figure 1 of the drawings) the stem end of the fruit is removed and the remainder of the fruit is split in longitudinal halves and the halves deposited in paired receptacles. At station B, where the present apparatus is applied, the halves disposed in the paired receptacles are pared. At station C the halves are cored and the body of the fruit is removed from the receptacles, leaving the pare and core therein. At station D the pares and cores are scavenged from the receptacles. The entire machine and its various operating devices are actuated in a timed and synchronous relation. It is understood that our invention is applicable to any type of machine and may be used in coring and pitting fruit as well as peeling fruit.

A framework for the fruit treating machine comprises four corner upright posts 10, 11, 12 and 13, see Figure 1, held in a rectangular position by an upper transverse supporting frame member 14 and a lower transverse frame member 15.

Bearing brackets 16, see Figure 2, secured to the lower frame member 15 support a cam shaft 17. A pulley 18 is keyed on one end of the cam shaft 17 outside of the framework and a double faced cam 19 is keyed on the cam shaft 17 just inside of the framework. The pulley 18 may be driven in any suitable manner.

A bevel gear 20 keyed on the cam shaft 17 meshes with a bevel pinion 21 fixed on the lower end of a vertical stud shaft 22. A driving arm of a Geneva movement is fixed on the upper end of the stud shaft 22. A roller 23 rotatively fixed on the outer end of the Geneva driving arm meshes with a Geneva gear 24 keyed on the lower end of a turret driving sleeve 25 around a central vertical shaft 26.

A bracket 27 extending upwardly from the lower frame member 15 supports a bearing block 28. The bearing block 28 has two apertures in which the lower ends of the shaft 26 and stud shaft 22 are journaled. The upper end of shaft 26 is journaled in a central bearing in the upper frame member 14.

A turret 29, see Figure 1, is fixed to the upper end of the turret sleeve 25. The turret 29 is composed of a central hub 30 having radially extending spokes 31 spaced ninety degrees apart around such central hub 30. Transverse webs 32 are integral with the ends of the spokes 31 and are reenforced by tangential webs 33.

Each fruit holder is composed of two substantially identical sections, one a stationary element 224a which embodies a cup wall 225 with a stem 226 depending downwardly therefrom. This stem half-way down provides a seat for resting upon a boss 222 of the turret 33. The extreme lower part of the stem 226 carries a notch 228 for registering with an aperture 229 within the boss 222. A bolt 230 co-contained by notch 228 and aperture 229 serves to secure the stem 226 to the boss. It is the purpose of notch 228 to facilitate the removal and replacement of different sized fruit cups from the turret. Irrespective of the size of the fruit cups, the distance from the seat to the interior bottom of the cup remains the same, so that when a cup is placed upon boss 222 the peeling knife 85 will reach to a selected distance from the bottom of the cup. Adjustment of the path of swing of the blades 85 relating to the walls of the fruit cups is had by moving the support for the blades.

In the right side of the stem 226 is an enlarged portion 231 which is threaded for the insertion of a stub shaft 232 thereinto. The center portion of stub shaft 232 contains a deep groove 233 into which a set screw 234 may be inserted for maintaining a selected position of the shaft within the projection 231. The movable element 235 of the cup has depending therefrom two journal members 235a and 236 at the back and front side respectively. Journal members 235a and 236 are disposed at opposite sides of the enlarged portion 231 of the stem 226 and the journals therein receive opposite ends of the stub shaft 232. The cup walls 237 of the element 235 are then capable of being moved toward and away from the cup walls 225 by pivoting about the journals containing the ends of the stub shaft 232.

Projecting to the right from journal 235a is a short arm 238 containing a threaded aperture 239. Within the aperture is an adjustment bolt 240. The mechanism for opening and closing the two sections of the fruit cups is more specifically disclosed and claimed in the prior pending application of Mark Ewald, Serial No. 63,019, filed February 8, 1936, and no claims are made thereto except in combination with the conformation of the lop-sided pad 99 and in combination with the means for holding the pad locked in any one of a plurality of positions adjustable for varying thicknesses of the half fruit to be peeled, and in which respects the present application differs from the prior filed application of Mark Ewald.

The double faced cam 19, see Figure 2, keyed on cam shaft 17 has a cam groove 36 in which a cam roller 37 rides. The cam roller 37 is rotatably mounted upon a stud shaft 38. The stud shaft 38 is fixed to a cam follower plate 39. A bolt 40 secures the upper end of cam follower plate 39 to a tongue 41 of a yoke 42. The yoke 42 is mounted on the outside of the framework by vertical guides 43 and is free to reciprocate vertically therein. The guides 43 are secured to the uprights 12 and 13 by bolts 44.

The upper end of the yoke 42, see Figures 2 and 9, has two horizontal arms 45 extending inwardly of the framework, and two lugs 46 extending outwardly to support the paring apparatus.

The cam 19, see Figure 2, has a cam groove 47, complemental to cam groove 36 in the opposing face of such cam. A cam roller 48 rides in the cam groove 47 and is mounted on a stud shaft 49 from a cam follower plate 50.

The extended end of cam follower plate 50 has an ear 51, see Figure 8, apertured to receive a pin. One end of a link 52 is pivotally mounted on the pin. The other end of the link 52 is pivotally secured to an arm 53. The arm 53 is keyed on the lower end of a vertical rocker shaft 54. The rocker shaft 54 is journaled in bearings secured to the upright 12.

An arm 55 is keyed on the upper end of rocker shaft 54, see Figure 3. The free end of the arm 55 is apertured to receive a bolt 56. A clevis 57 is pivotally mounted on the bolt 56. An adjustable link 58 is pivotally secured to the clevis 57. The other end of the link 58 is threaded into a clevis 59. The clevis 59 is pivotally secured to a lever arm 60 by a bolt 61. The lever arm 60 is keyed on a horizontal rocker shaft 62, and fulcrums thereabout. The lever arm 60, hub 63, radial spokes 64, and a segmental gear 65 are cast as an integral member. A similar segmental gear 65a is fixed on the rear end of rocker shaft 62.

The arms 45 and lugs 46 of yoke 42 have tapped holes into which shanks of bolts 66 are threaded. A peeling head supporting bracket 67 is secured to the yoke 42.

The bracket 67 comprises a transverse member 69 and two lateral supporting members 70. The longitudinal center lines of the members 70 are directly above the center lines of the receptacles 34.

The transverse member 69 of the bracket 67, see Figure 3, engages the top surface of the yoke 42 and extends outwardly to both sides to form ears 68. The ears 68 are secured between the heads of the bolts 66 and the lugs 46. The lateral members 70 are provided with apertured ears 71 to engage the top surface of the arms 45 from yoke 42. The ears 71 are disposed between the arms 45 and heads of bolts 66.

A bearing standard 72, see Figure 4, is secured on the top of the transverse member 69 of bracket 67 and a similar bearing standard 73 bridges and is secured on the lateral supporting members 70 of bracket 67. The horizontal rocker shaft 62 is journaled in the bearing standards 72 and 73.

A segmental cam 74 is keyed on the rocker shaft 62 between the bearing standards 72 and 73 and has a high camming surface 75 and a low camming surface 76.

The rear ends of the lateral supporting members 70, of bracket 67, are provided with depending hook shaped bearing brackets 77 having apertures 78, see Figures 4 and 5. The transverse member 69 of bracket 67 is provided with depending hook shaped bearing brackets 79 similar to the brackets 77 and are in alignment therewith. The brackets 79 have apertures 80 in alignment with the apertures 78. The apertures 78 and 80 are parallel to the central line of the lateral supporting members 70. Spindles 81 are journaled in the apertures 78 and 80 and have keyed thereon pinions 82. The pinions 82 mesh with the segmental gears 65 and 65a.

The ends of the spindles 81, facing each other, have heads 83. Lugs 84 on the heads 83 provide a means for attaching a cutting mechanism herein shown as a paring knife 85. The paring knife 85 bridges the gap between the heads 83 and is complemental in configuration to the inside periphery of the receptacles 34.

The construction of the invention is shown most clearly in Figures 4, 5, 6 and 7; referring to such views:

Bolts 86 secure a spring retaining bracket 87 to the supporting bracket 67. The bracket 87 comprises two Z shaped upright brackets 88 interconnected and reenforced by a web 89. The brackets 88 have vertical slots 90 and ears 91. The ears 91 have horizontal bearing apertures 92.

The lateral supporting members 70 of bracket 67 are provided with elongated bosses 93 having vertical bores 94. The center lines of the bores 94 intersect the center line of the members 70.

Paring pad supporting sleeves 95, see Figures 4 and 5, are reciprocally maintained in the bores 94. Heads 96 integral with the lower ends of the sleeves 95 have slots 97. Paring pads 99 are provided with lugs 100 to fit within the slots 97 and are pivotally maintained therein by pins 101. The tilting of the pads 99 is confined by the upper surface of the lugs 100 engaging the heads 96.

An auxiliary fruit holding means herein shown as a fruit contacting member, and specifically herein illustrated as pad 99, see Figure 5, is made full size on the side where the cup is stationary but, on the hinged side, this pad is cut down so that the cup can close while the pad is down on the cup to allow the fruit to be pushed over when it is smaller than the predetermined diameter of the peeling knife.

Recesses 102 in the pads 99 allow the heads 103, of suction breaking plunger stems 104, to be pushed back into the pads 99 when such pads engage the flat face of a halved fruit during their effective positions. The stems 104 are free to reciprocate within central bores 105. The bores 105 are enlarged at 106 for springs 107. The springs 107 are maintained between the shoulders 108, of the bores 106, and collars 109 pinned to the stems 104. Collars 110 pinned to the upper end of stems 104 limit the downward movement of the stems 104.

Plates 111 having tongues 112 are fixed on the sleeves 95 by pins 113. The tongues 112 lie within the slots 90 in the spring retaining brackets and are free to reciprocate therein. Pawl plates 114 are secured on the tongues 112 by screws 115.

Spring tension adjusting screws 116 are threaded through tapped holes 117 in the brackets 88 and are provided with a lock nut 118 and spring locating washers 119. Springs 120 are positioned between the washers 119 and plates 111. The lower ends of the springs 120 are centered by the sleeves 95.

A ratchet supporting shaft 121 is journaled in the bearing apertures 91 in the brackets 88. A collar 122 is securely fixed on the shaft 121 directly above the rocker shaft 62 by a set screw 123. A cam roller 124 is pinioned on the collar 122 by a stud bolt 125.

Sets of ratchets, see Figures 5 and 6, consisting of ratchet 126 and ratchet 127, are fulcrumed on the shaft 121, each set of ratchets being in alignment with the pawls 114. Washers 128 are placed between the ratchets 126 and 127 to prevent frictional engagement of such ratchets. The ratchets 126 and 127 are maintained in position between the ears 91 and washers 129 secured to the ends of the shaft 121 by screws 130.

The ratchets 126 and 127 comprise hubs 131 having key-ways 132, vertical arms 133 having tabs 134, and depending legs 135 having ratchet teeth 136. The ratchet teeth 136 in the ratchets 126 and 127 are staggered in relation to one another for the purpose of allowing finer adjustment of the pawl thereon. The key-ways 132 are slightly larger than keys 137 in the shaft 121, allowing limited free motion of the ratchets 126 and 127 on the shaft 121.

A spring 138 is positioned between each set of ratchets and the brackets 88. One end of the spring 138 sets in a socket 139 in the bracket 88 and the other end of the spring 138 encompasses the tabs 134 on the vertical arms 133 of ratchets 126 and 127. A constant spring pressure is exerted against both arms 133 as may clearly be seen on reference to Figure 7 of the drawings.

The operation of the specific fruit retaining apparatus herein disclosed is as follows:

Whole fruit is fed into the bobbing and splitting apparatus at station A where the stem end of the fruit is removed and the remainder of such fruit is split into longitudinal halves and the halves are spread and deposited into the paired receptacles 34 with the flat cut face of the fruit exposed upwardly. The paired receptacles 34 with the halved fruit therein are rotatively advanced to station B where they come to rest.

With the receptacles in such position the peeling head is lowered by the coaction of the yoke 42, follower plate 39 and cam roller 37 riding down in the cam track 36. Prior to the lowering of the peeling head the paring knives 85 are returned to their initial positions (to the left as viewed from the front of the machine). The paring knives 85 are returned to their initial positions by the roller 48 riding down in a drop in the cam track 47 which reciprocates the cam follower plate 50 to the right (referring to Figure 1). The reciprocation of the plate 50 is transformed into a rocking motion of the shaft 54 by the arm 53. The rocking motion of the shaft 54 oscillates the arm 55 in a clockwise direction. The oscillation of the arm 55, through the link 58 rocks the lever arm 60, shaft 62 and segmental gear in a counter-clockwise direction. The counter-clockwise rocking of the gear 65 rotates the pinions 82, spindles 81, and paring knives 85 in a clockwise direction as viewed in Figure 3.

The counter-clockwise oscillation of the shaft 62 brings the high camming surface 75 of cam 74 in contact with the cam roller 124, pushing it in a counter-clockwise direction (referring to Figure 5). The roller 124 through the collar 122 turns the shaft 121 which brings the key 137 into engagement with key-ways 132 in the ratchets 126 and 127 forcing them in a counter-clockwise direction against the action of the springs 138. The action of the ratchets 126 and 127 retracts the ratchet teeth 136 from the path of the pawls 114, allowing a free reciprocal action of the retaining pads or auxiliary holding means 99.

When the peeling head is lowered onto the halved fruit in the receptacles, the flat face of the fruit first engages the plunger head 103, forcing it upwardly into the recess 102 against the action of the spring 107. The flat face of the fruit next engages the peeling pad 99 and forces it upwardly against the action of the spring 120; the tension of the spring 120 is light to avoid bruising the fruit.

When the peeling head is lowered sufficiently to bring the center of the spindles 81 in alignment with the flat face of the fruit, the lowering motion of the peeling head is terminated by a discontinuance of the dropping surface in the cam track 36. The cam track 36 continues into a concentric track which maintains the peeling head in a lowered position.

With the peeling head in such lowered position, a rise in the cam track 47 oscillates the shaft 62 in a clockwise direction. The oscillation of the shaft 62 causes the low camming surface 76 under the roller 124 rotating the ratchet shaft 121 to release the ratchets 126 and 127. The ratchet teeth in either ratchet 126 or ratchet 127 engage the pawl plate 114 and lock it on the position it was raised to by the fruit in the receptacles 34.

Continued oscillation of the shaft 62 causes the pinions 82 to rotate in a counter-clockwise direction, which forces the paring knife in an arc through the body of the fruit, severing the peel therefrom. The knife 85 passes the lowermost point and begins its upward arcuate travel, creating pressure against the retaining pad 99. The upward pressure against the pad 99 is resisted by the pawl 114 locked by the ratchet teeth 136 in the ratchet 126 or ratchet 127.

Upon the completion of the paring stroke the paring knife 85 is in the position shown in Figure 4. With the knife in such position a rise in the cam track 36 lifts the paring head out of engagement of the fruit and is returned to its initial position as shown in Figure 2.

A suction is created by the pad 99 engaging the wet flat face of the halved fruit. Such suction is broken by the spring pressed plunger 103 when the peeling head begins its ascent. The area of the pad 103 is so small that the weight of the fruit alone will break any vacuum.

When the peeling head has cleared the receptacles 34, the turret 29 rotatively advances to bring the receptacles 34 from station B to station C, the receptacles coming to rest in such position.

At station C the pared fruit in the receptacles is cored and the body of the fruit is ejected from the receptacles, leaving the pares and cores therein. The receptacles with such refuse therein are rotatively advanced to station D where the receptacles come to rest.

At station D the refuse is scavenged from the receptacles, leaving them free to begin a new cycle of operation.

What is claimed as new and is desired to be secured by Letters Patent of the United States is:

1. In a fruit treating apparatus for treating half fruit, the combination of holding means having portions adapted to contact the curved surface of a half fruit to hold it substantially stationary, auxiliary holding means including a member shaped to conform substantially to the cross-sectional area of the cut face of the half fruit and adapted to press against the cut face of the half fruit, power means for advancing said member into contact with the cut face of the fruit, including a yieldable mounting whereby said contact member may automatically yield to any one of a plurality of positions to accommodate the half fruit while pressing against the cut face of the half fruit, means for positively locking the contact member in any such position, and means for cutting into the cut face of the half fruit while so held.

2. In a fruit peeling apparatus, the combination of holding means contacting the curved surface of a half fruit with its face exposed, a flat-faced supplemental holding means adapted to engage the cut, exposed face of the half fruit except at the marginal portions thereof adjacent the peel, means moving the flat-faced means into contact with the face of the fruit, yieldable means providing automatically adjustable movement of the flat-faced means relative to the first-mentioned holding means, means adapted automatically and positively to lock the flat-faced means in said position or alternately in any of a plurality of other positions, and peeling means automatically operative upon the locking of said flat-faced means to peel the fruit.

3. A fruit peeling apparatus comprising means holding half fruit with its face exposed, supplemental fruit holding means, mechanism for moving the holding means and the supplemental holding means relatively to substantially enclose a half fruit, instrumentalities providing a variable yieldable travel of the supplemental holding means relative to the first-mentioned holding means due to contact of the holding means and the supplemental holding means with the half fruit, to accommodate various thicknesses of half fruit therebetween, and means actuated upon the termination of the relative variable travel between said holding means and said supplemental holding means to lock said holding means against relative travel, and power means for peeling the fruit when the locking means is operative.

4. In a fruit peeling apparatus, the combination of fruit holding means adapted to hold a half fruit with its cut face exposed, a support, power means to advance and retract said support toward and from said holding means, supplemental fruit holding means yieldably mounted on said support and adapted yieldably to engage the cut face of the half fruit on advance movement of the support and to yield relative to the support a variable distance corresponding with the thickness of the half fruit, and means adapted lockingly to engage the supplemental fruit holding member in any one of a range of adjustable positions into which it may move, and peeling means operable upon the fruit held by said holding means.

5. In a fruit peeling apparatus, the combination of fruit holding means for holding a half fruit, a support, means for moving said support relatively to said holding means, a power-driven shaft on said support, fruit peeling means on said support and operated by said shaft, fruit contacting means yieldably mounted on and relative to said support and capable of a variable travel relative to said support, means on said support providing a variable locking engagement with said contacting means to lock said contacting means against yielding movement.

6. In a fruit peeling apparatus, the combination of fruit holding means for holding a half fruit, a support, means for moving said support relatively to said holding means, a power-driven shaft on said support, fruit peeling means on said support and operated by said shaft, fruit contacting means yieldably mounted on and relative to said support and capable of a variable travel relative to said support, means on said support providing a variable locking engagement with said contacting means to lock said contacting means against yielding movement, and means operable from said power shaft to actuate said locking engagement.

7. In a fruit treating apparatus, the combination of fruit holding means, a support, power means for moving said support relatively to and from said holding means, a power-driven shaft on said support, cutting means on said support actuated thereby, a fruit contacting member movably mounted on said support, spring means normally urging said member toward said fruit holding means, a second shaft on said support, pawl means on said shaft, a ratchet on said contact means, a cam on said power-driven shaft, and means operated by said cam for shifting the pawl and ratchet mechanism relatively to lock said contact member from yielding movement away from said fruit holding means.

8. In a fruit treating apparatus, the combination of fruit holding means for holding a half fruit with its cut face exposed, a support movable relatively to said holding means, fruit contacting means movably mounted on and relative to said support for engagement with the cut face of the fruit held by said holding means, spring means normally urging said contact means toward said face of the fruit, locking means for said contact means including pawl and ratchet mechanisms interconnecting said contact means and support and adapted variably to engage to provide a variable adjustment for the locking means and means for peeling the half fruit while so held.

9. In a fruit treating apparatus, the combination of fruit holding means for holding a half fruit with its cut face exposed, a support movable relative to said holding means, fruit contacting means movably mounted on and relative to said support for engagement with the cut face of the fruit held by said holding means, spring means normally urging said contact means toward said face of the fruit, said contact means including a pawl, a power-driven shaft on said support, a cutter mechanism actuated thereby for engagement with the fruit when held between the fruit holding means and the contact means, a second shaft on said support, a ratchet having a toothed edge adapted to be turned by said second shaft, spring means normally forcing said pawl and ratchet into engagement, and means synchronized with the movement of said cutting means for actuating said second shaft in accordance with predetermined movements of the first shaft for releasing said pawl and ratchet mechanism at a predetermined time.

10. In a fruit treating apparatus, the combination of fruit holding means for holding a half fruit with its cut face exposed, a support movable relative to said holding means, fruit contacting means movably mounted on and relative to said support for engagement with the cut face of the fruit held by said holding means, spring means normally urging said contact means toward said face of the fruit, said contact means including a pawl, a power-driven shaft on said support, a cutter mechanism actuated thereby for engagement with the fruit when held between the fruit holding means and the contact means, a second shaft on said support, a plurality of ratchets mounted on said second shaft for rotation therewith, each of said ratchets having teeth, the teeth of said respective ratchets being disposed in staggered relation with respect to each other, and the teeth of all of said ratchets being disposed for common engagement with the pawl on the contact member, spring means for forcing all of said ratchets into engagement with said pawl and driving means interconnecting the first and second shafts on said support for releasing said ratchets from said pawl at predetermined movements of the cutter shaft.

11. In a fruit treating apparatus, the combination of fruit holding means for holding a half fruit with its cut face exposed, a support movable relative to said holding means, fruit contacting means movably mounted on and relative to said support for engagement with the cut face of the fruit held by said holding means, spring means normally urging said contact means toward said face of the fruit, said contact means including a pawl, a power-driven shaft on said support, a cutter mechanism actuated thereby for engagement with the fruit when held between the fruit holding means and the contact means, a second shaft on said support, a ratchet mechanism having a hub portion disposed on said shaft, the hub portion being provided with a slot, a spline on said shaft engaging in said slot, the slot being larger than the spline whereby to provide a slight lost motion between the movement of the shaft and the movement of the ratchet, said ratchet having a toothed depending portion adapted for engagement with the pawl on said contact member and having an extending portion, there being spring means between said support and said extending portion for normally urging the ratchet in contact with the pawl, and driving interconnections between said first and second mentioned shafts for operatively removing said ratchet from engagement with said pawl.

12. In a fruit peeling apparatus, the combination of holding means having a recessed portion, the walls of which are adapted to engage and support the curved surfaces of a half fruit to be peeled, auxiliary holding means for the half fruit adapted to engage and press against the cut face of the half fruit at a plurality of zones spaced slightly inwardly from the border line of the peel of the fruit in a direction toward the seed-carrying section of the half fruit, power means for advancing said second-mentioned holding means into pressing contact with the cut face of the fruit including yieldable means whereby said pressing means may automatically yield to any one of a plurality of positions to accommodate half fruit of variant thicknesses, means for positively locking the pressing member in any such position, and peeling means operable to remove the peel of the fruit while the half fruit is held between said holding members.

13. In a fruit peeling device, the combination of a fruit holder being shaped to support therein the curved surface of a half fruit with the cut face exposed, support means having peeling means mounted thereon and adapted to be positioned adjacent the cut face of the fruit, means for moving the peeling means arcuately to cause it to move inwardly from the cut face through the half fruit and then to move outwardly through the fruit to complete the peeling cut, auxiliary fruit holding means having a relatively flat surface shaped to conform substantially to the cross-sectional area of the cut face of the half fruit, the border line of said last-named means terminating short of that zone of the fruit carrying the peel whereby to permit free peeling movement of the peeling means while the fruit is confined between the fruit holder and the auxiliary holding means, means for yieldingly pressing the auxiliary holding means into contact with the cut face of the fruit, means for positively locking the auxiliary holding means from yielding in any one of a number of positions, and means for releasing the locking means.

14. In a fruit peeling device, the combination of a fruit holder shaped to support therein the curved surface of a half fruit, support means having peeling means mounted thereon and adapted to be positioned adjacent the cut face of the fruit, means for moving the peeling means arcuately to cause it to move inwardly through the half fruit and then to move outwardly through the fruit to complete the peeling cut, auxiliary fruit holding means comprising means having a relatively flat surface shaped to conform substantially to the cross-sectional area of the cut face of the half fruit, the border line of said last-named means terminating short of the zone of the fruit carrying the peel whereby to permit free peeling movement of the peeling means while the fruit is confined between the fruit holder and the auxiliary holding means, and a pawl and ratchet mechanism adapted to interconnect said support and auxiliary holding means and automatically to be brought into locking engagement for positively locking the auxiliary holding means into pressing engagement with the cut face of the fruit for holding the fruit from outward movement in its holder during the movement of the peeling means outwardly through the flesh of the fruit.

15. In a fruit peeling device, the combination of a fruit holder shaped to receive therein the curved surface of a half fruit, support means including a peeling knife mounted thereon and adapted to be positioned adjacent the cut face of the fruit, means for moving the peeling knife arcuately to cause it to move inwardly through the half fruit and then to move outwardly through the fruit to complete the peeling cut, auxiliary fruit holding means having a relatively flat surface shaped to conform substantially to the cross-sectional area of the cut face of the half fruit, the border line of said last-named means terminating short of the zone of the fruit carrying the peel whereby to permit free peeling movement of the peeling means while the fruit is confined between the fruit cup and the auxiliary holding means, and a pawl mounted on the auxiliary holding means and a ratchet mounted upon the support and adapted to be brought into locking engagement for locking the auxiliary holding means into pressing engagement with the cut face, whereby to resist movement of the fruit in its holder during the peeling of the fruit.

16. In a fruit treating apparatus for treating half fruit, the combination of means forming a cup, the inner walls of said cup being adapted to contact and support the curved surface of a half fruit with the cut face of the half fruit exposed, auxiliary holding means for the half fruit comprising means forming a flat surface having a contour corresponding substantially to the cross-sectional shape of the cut face of the half fruit, that half of the auxiliary means overlying one portion of the cup being of lesser area than the corresponding opposite marginal portion, means for pressing the auxiliary holding means into engagement with the cut face of the fruit, and means for peeling the half fruit while contacted by said holding means.

17. In a fruit treating apparatus, the combination of a turret having a plurality of cup-shaped members, each having an inner wall adapted to support a curved surface of a half fruit with the cut face exposed, a support, means for shifting the support toward and from the fruit holder, auxiliary fruit holding means yieldingly mounted on said support and having a flat surface shaped to conform substantially to the cross-sectional area of the half fruit supported in the cup, means for moving the support for bringing the auxiliary holding means into pressing engagement with the cut face of the fruit while in the cup, means carried by the support for permitting free yielding movement of the auxiliary holding means upon approach of the support toward the cup, means automatically operative upon the pressing engagement of said auxiliary holding means with the face of the fruit for positively locking said auxiliary holding means in one of a plurality of adjustably set positions, power-operated means for actuating the peeling knife through the body of the fruit to sever the peel therefrom, and means for thereafter retracting the support and auxiliary holding means from the face of the fruit.

18. Fruit treating apparatus comprising means for holding a half fruit by contacting with the convex portion of the fruit, auxiliary holding means including a surface adapted to contact the flat cut face of the half fruit for restraining the half fruit from shifting movement relative to the holding means, power means for relatively advancing said auxiliary holding means and said first holding means whereby said auxiliary holding means contacts with the flat face of the half fruit, said advancing means including yieldable means whereby said contacting surface is adapted to yield relatively to the advancing means into any one of a plurality of positions to accommodate the thickness of the half fruit while pressing against the cut face of the half fruit, means for cutting into the surface of the half fruit while so held by said contacting means, and means for positively locking the contacting means in any one of said plurality of such contacting positions.

19. Fruit treating apparatus comprising means for holding a half fruit by contacting with the convex portion of the fruit, supporting means, power driven means for shifting said supporting means toward and from the cut face of the half fruit, cutting means mounted on said supporting means and adapted to be moved into contact with the cut face of the half fruit to cut into the flesh of the half fruit, auxiliary holding means mounted on said support and having a surface adapted to contact the flat cut face of the half fruit for restraining the half fruit from shifting movement relative to the holding means during cutting, means whereby said contacting means is adapted to yield relatively to the support to any one of a series of positions depending upon the thickness of the half fruit, and means for locking the contacting means in any one of said positions during at least a portion of the movement of the cutting means.

20. In an apparatus for treating half fruit, the combination of holding means for engaging the convex surface of a half fruit, cutting means movable from the cut face of the fruit inwardly of the fruit and thence outwardly of the fruit, holding means adapted to contact the cut face of the half fruit during the cutting action, means for yieldingly mounting the holding means to permit the holding means to move to any one of a series of positions depending upon the thickness of the half fruit, and means for rigidly holding the holding means in any one of said series of shifted positions during the outward movement of the cutting means only.

21. In an apparatus for treating half fruit, the combination of holding means for engaging the convex surface of a half fruit, cutting means movable through the flesh of the fruit, holding means adapted to contact the cut face of the half fruit during the cutting action, means for yieldingly mounting the second mentioned holding means to permit it to move to any one of a series of positions depending upon the thickness of the half fruit, and means automatically operated for rigidly holding the second mentioned holding means in any one of said series of shifted positions during at least a portion of the movement of the cutting means through the half fruit.

22. In a device of the class described, the combination of holding means for contacting the convex portion of a half fruit to hold the same, a power operated support adapted to be shifted toward and from the cut surface of the half fruit while so held, peeling means mounted on said support, means for oscillating the peeling means to cause the peeling means to peel the fruit while held in said first mentioned supporting means, auxiliary holding means mounted on said support, including a yieldable mounting whereby said auxiliary holding means may yield to any one of a plurality of adjusted positions proportionate to the thickness of the fruit contacted by said auxiliary holding means, and power actuated means for automatically locking the auxiliary holding means in any one of said series of adjusted positions during at least a portion of the peeling operation.

23. In a device of the class described, the combination of means for supporting a half fruit by contacting with the convex surface of the half fruit and with the cut face of the half fruit lying exposed in a horizontal plane, a support mounted above the cut face of the half fruit when so supported, means for vertically shifting said support toward and from the cut face of the half fruit, cutting means carried by said support and adapted to be brought into juxtaposition to the cut face of the half fruit, means mounted on said support for shifting the cutting means to cause it to cut into the flesh of the half fruit, auxiliary holding means mounted on said support, including a portion vertically shiftable of said support, and including a portion carried thereby adapted to contact the flat cut face of the half fruit, means for yieldingly supporting said vertically shiftable portion to permit it to rise vertically to any one of a series of positions when the contacting surface contacts the cut face of the half fruit, and power actuated means carried by said support for automatically locking the contacting means in any one of its series of adjusted positions, whereby said contacting means will hold the half fruit from shifting in the first mentioned holding means during at least a portion of the cutting operation.

24. In a device of the class described, the combination of holding means adapted to engage the convex surface of a half fruit to hold the same, said holding means including relatively shiftable sections, auxiliary holding means adapted to be brought into contact with the cut face of the half fruit while held in said first mentioned holding means, said auxiliary holding means being of the general shape whereby to lie flat against the cut surface of the half fruit on opposite sides of a line passing diametrally through the cut face of the half fruit, the portion of the contacting means on one side of said diametral line being wider than the portion on the opposite side of said diametral line to permit a shifting movement of one of the relatively shiftable sections of the holding means, and means for peeling the half fruit while held by said holding means.

25. In a device of the class described the combination of two-part holding means comprising a stationary part and a shiftable part mounted for movement toward and from the stationary part, said parts being adapted to engage the curved surface of a half fruit to hold the same, auxiliary holding means including a surface generally shaped to conform to the cut face of the half fruit, means for moving the auxiliary holding means into contact with the cut surface of the half fruit while held in said first mentioned holding means, means for peeling the half fruit while held between said first and second mentioned holding means, and means for shifting the movable part of said first mentioned holding means toward the stationary part, said auxiliary holding means being of less width on the side overlying the shiftable part of the holding means than on the side overlying the stationary part of the holding means, whereby to permit free shifting of the shiftable part of said holding means while said auxiliary holding means is contacting the half fruit.

26. In a fruit peeling device, the combination of a fruit holder shaped to support therein the curved surface of a half fruit, peeling means adapted to move arcuately through the flesh of the fruit adjacent the peel while said half fruit is so supported, auxiliary fruit holding means including relatively flat surfaces adapted to be positioned to overlie those portions of the cut face of the half fruit which are spaced inwardly slightly from the arcuate path of movement of the peeling means when severing the peel, whereby to support those surfaces of the cut face of the half fruit during peeling while permitting the free passage of the peeling means into and out of said fruit holder while said auxiliary holding means is so positioned, means for advancing said auxiliary fruit holding means into pressing contact with the cut face of the half fruit including a yieldable mounting whereby said supporting surfaces may automatically yield to any one of a plurality of positions to accommodate the half fruit, and means for positively locking the supporting surfaces in any such position.

27. In a fruit treating apparatus for treating half fruit, the combination of means forming a recessed holder having relatively shiftable opposed supporting walls for contacting the curved surfaces of a half fruit with the cut face exposed, auxiliary holding means including surfaces adapted to be advanced relatively to said recessed holder to any one of a plurality of positions wherein said auxiliary surfaces lie within the upper portions of said recessed holder, means for positively locking said auxiliary holding means in any one of said last mentioned positions whereby said half fruit is held from turning in said recessed holder, cutting means adapted to peel the half fruit while so held, and means for relatively shifting the opposed supporting walls of the recessed holder while said auxiliary holding means is so positively locked, to permit lateral shifting of the half fruit in said recessed means and relatively to said auxiliary means during peeling.

28. In a fruit treating apparatus for treating half fruit, the combination of means forming a cup including a stationary portion and a portion movably associated therewith, the inner walls of said cup being adapted to contact and support the curved surfaces of a half fruit with the cut face of the half fruit exposed, auxiliary fruit holding means comprising means forming flat surfaces adapted to overlie and support those portions of the half fruit adjacent but slightly spaced inwardly of the peel, means for locking the auxiliary holding means with its supporting surfaces in pressing contact with the cut face of the half fruit and within the plane of the top of the cup, means for arcuately shifting peeling means through the flesh of the fruit while so supported, means for shifting the movable cup portion inwardly toward the stationary wall to a position such that the cup walls form less than a hemispherical shape to press the fruit toward said stationary cup wall, and means for thereafter shifting said movable wall away from said stationary wall to permit lateral movement of said half fruit into contact with said movable wall and while said auxiliary holding means is so locked, that portion of the auxiliary supporting means overlying the movable wall lying nearer the center of arcuate movement of the peeling means whereby to permit movement of the movable wall of the cup toward the stationary wall of the cup.

29. A fruit treating apparatus comprising means for holding a half fruit with its cut face exposed, supplemental fruit holding means adapted to contact the cut face of the half fruit on opposite sides of its stem axis, whereby to hold the half fruit from turning during the cutting operation, mechanism for moving the holding means and the supplemental holding means relatively toward and from each other, said mechanism including instrumentalities providing a variable yieldable travel of the supplemental holding means relatively to the first mentioned holding means due to contact of the holding means with half fruits of various thicknesses, and means associated with said instrumentalities whereby to lock said supplemental holding means and said holding means against relative separating movement with respect to any one of the various spaced apart positions assumed by said holding means and said supplemental holding means.

30. A fruit treating apparatus comprising means for holding a half fruit with its cut face exposed, supplemental fruit holding means adapted to contact the cut face of the half fruit on opposite sides of its stem axis, whereby to hold the half fruit from turning during the cutting operation, mechanism for moving the holding means and the supplemental holding means relatively toward and from each other, said mechanism including instrumentalities providing a variable yieldable travel of the supplemental holding means relatively to the first mentioned holding means due to contact of the holding means and the supplemental holding means with half fruits of various thicknesses, means associated with said instrumentalities whereby to lock said supplemental holding means and said holding means against relative movement in various relative spaced positions of said supplemental holding means and said holding means, and means for cutting into the cut face of the half fruit when said holding means and said supplemental holding means are locked against relative travel.

31. A fruit treating apparatus comprising means for holding a half fruit with its cut face exposed, supplemental fruit holding means adapted to contact the cut face of the half fruit on opposite sides of its longitudinal seed axis, mechanism for relatively shifting the holding means and the supplemental holding means toward and away from each other, including instrumentalities providing a variable yieldable approaching travel of the supplemental holding means relative to the first mentioned holding means due to contact of the supplemental holding means and the first mentioned holding means with the half fruit in accommodating various thicknesses of half fruit therebetween, and means actuated irrespective of the relative variable approaching travel between said holding means and said supplemental holding means for locking said holding means and said supplemental holding means against relative travel away from each other.

32. A fruit treating apparatus comprising means for holding a half fruit with its cut face exposed, supplemental fruit holding means adapted to contact the cut face of the half fruit on opposite sides of its longitudinal seed axis, mechanism for relatively shifting the holding means and the supplemental holding means toward and away from each other, including instrumentalities providing a variable yieldable approaching travel of the supplemental holding means relative to the first mentioned holding means due to contact of the supplemental holding means and the first mentioned holding means with the half fruit in accommodating various thicknesses of half fruit therebetween, means actuated upon the termination of and irrespective of variations in distance of the relative approaching travel between said holding means and said supplemental holding means to lock said holding means and said supplemental holding means against relative travel away from each other, and means for forming a cut in the cut face of the half fruit when said locking means is operated.

33. In a fruit treating apparatus, the combination of first holding means for holding a half fruit with its cut face exposed, a support, means for providing relative approaching and receding movement between said support and said fruit holding means, a power driven shaft on said support, a power driven actuator on said shaft, fruit cutting means on said support operated by said actuator, additional fruit holding means yieldably mounted on said support and capable of variable relative travel with respect to said support, means on said support providing a variable locking engagement with said additional fruit holding means, and means to lock said additional fruit holding means against yieldable movement.

34. In an apparatus for treating a half fruit, the combination of a first holding means for engaging the convex surface of the half fruit, cutting means movable through the flesh of the half fruit, a second holding means adapted to contact the cut face of the half fruit, means for yieldingly mounting one of said holding means to permit it to move relatively to the other holding means to any one of a series of shifted positions, depending upon the thickness of the half fruit, and means automatically operated for rigidly holding said last mentioned holding means in any one of said series of shifted positions.

35. In an apparatus for treating half fruit, the combination of a first holding means for engaging the convex surface of the half fruit, cutting means movable through the flesh of the half fruit, a second holding means adapted to contact the cut face of the half fruit, and means for relatively shifting said holding means toward each other to different relatively spaced apart positions determined by the thickness of the half fruit, said means including mechanism for preventing relative movement of said first and second holding means away from each other during at least a portion of the movement of the cutting means through the half fruit.

36. In an apparatus for treating half fruit, the combination of a first holding means for engaging the convex surface of a half fruit, cutting means movable through the flesh of the fruit, a second holding means adapted to contact the cut face of the half fruit during the cutting action, means to cause said holding means relatively to approach each other and to take up any one of a plurality of positions relatively spaced apart, depending on the thickness of the half fruit therebetween, and means for thereafter preventing said means relatively moving apart from such spaced apart positions.

37. In an apparatus for treating half fruit, the combination of a first holding means for engaging the convex surface of a half fruit, cutting means movable through the flesh of the fruit, a second holding means adapted to contact the cut face of the half fruit during the cutting action, means to cause said holding means relatively yieldingly to approach each other and to take up any one of a plurality of positions relatively spaced apart, depending on the thickness of the half fruit therebetween, and means for thereafter preventing said means relatively moving apart from such spaced apart positions.

38. In an apparatus for treating half fruit, the combination of a first holding means for engaging the convex surface of the half fruit, a second holding means adapted to contact the cut face of the half fruit, power actuated means for causing relative approaching movement between said first and second mentioned holding means to any one of a series of spaced apart positions, depending upon the thickness of the half fruit therebetween, power actuated means for preventing said means from moving apart relatively after assuming one of said series of spaced apart positions, and power actuated means for operating said cutting means during the time said holding means are held against relative separation.

MARK EWALD.
HENRY SKOG.